June 6, 1939. E. W. ANDERSON 2,161,607
NASAL FILTER DEVICE
Filed Feb. 9, 1938
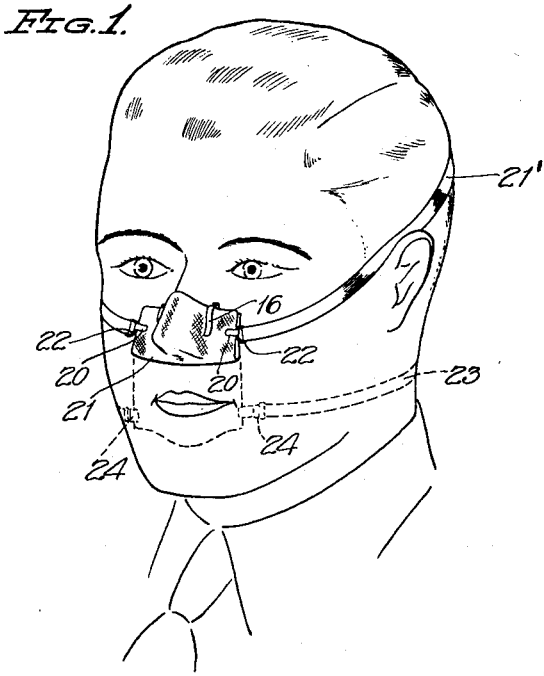
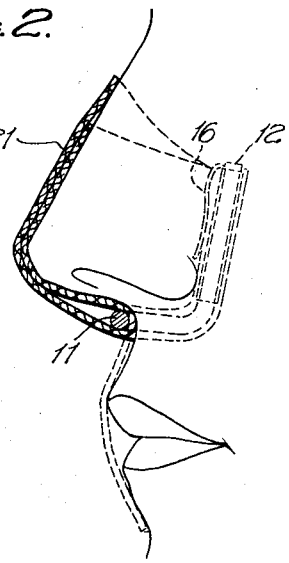
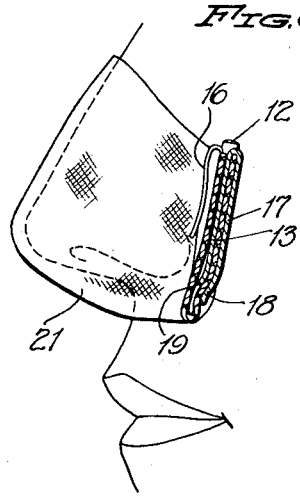
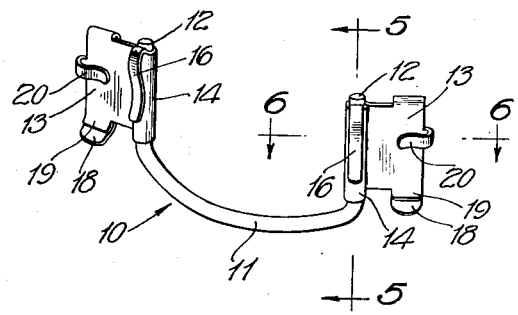
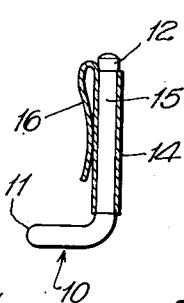
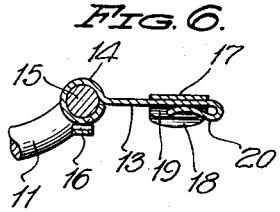
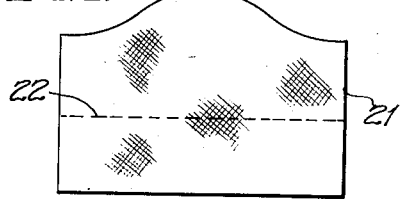
ELMER W. ANDERSON.
INVENTOR.
BY Ely & Pattison
ATTORNEYS.

Patented June 6, 1939

2,161,607

UNITED STATES PATENT OFFICE 2,161,607

NASAL FILTER DEVICE

Elmer W. Anderson, Leonia, N. J.

Application February 9, 1938, Serial No. 189,493

8 Claims. (Cl. 128—148)

This invention relates to improvements in nasal filters for use by persons troubled with hay fever and other similar ailments which are caused by, or which are aggravated by the inhalation of very fine air-born particles such as pollen, animal dander, molds, spores, dusts, smoke, soot, fuzz, lint, etc.

Respirators and masks have been devised and used for the purpose of preventing, through filtration, the inhalation of such injurious particles. Such respirators and masks, however, are cumbersome and unsightly. Other filter devices have been designed which are intended to be clamped to the septum of the nose in order to be held in place. Filter devices of this latter type are uncomfortable to the wearer and are painful to the delicate membranes of the nose with which they come in contact under the pressure of the clamping elements of the device.

It is therefore one of the main objects of this invention to provide a nasal filter device which is external to the nose and yet is small enough so that it does not interfere with vision; which is neat in appearance and light in weight; which is capable of being quickly applied in position and as readily removed; which is comfortable when in applied position; which does not press against or come in contact with the sensitive membranes of the nose; and which is positive in its filtering action.

Another feature of the invention is the provision of a nasal filter device the frame of which is pliable and capable of being bent to facilitate snug adjustment of the device so that it conforms closely to the contour of that part of the user's upper lip which is immediately below the nostrils, and to the sides of the nose adjacent to the face.

A further feature of the invention is to provide a nasal filter which includes a face fitting frame which removably and adjustably supports a gauze filter cloth so as to facilitate quick replacement of a used filter cloth with a new one when desired, and so as to facilitate the adjustment of the filter cloth in order to have it fit snugly about the nose.

A still further object of the invention is the provision of a nasal filter device embodying the above mentioned features and which is of simple construction and of inexpensive manufacture.

Other features of the invention will be readily apparent as the following specification is read in conjunction with the accompanying drawing, in which, Figure 1 is a perspective view of my nasal filter device in position for use upon the head of a user.

Figure 2 is an enlarged central vertical sectional view.

Figure 3 is a vertical sectional view taken on a line through one of the inner cloth fastening clips.

Figure 4 is a perspective view of the skeleton framework of the device per se.

Figure 5 is a detail vertical sectional view on the line 5—5 of Figure 4.

Figure 6 is a horizontal sectional view on the line 6—6 of Figure 4.

Figure 7 is a plan view of the gauze filter cloth in unfolded condition.

Referring to the drawing by reference characters, the numeral 10 designates a rigid U-shaped frame which includes a pre-formed forwardly bowed bight portion 11, and spaced upwardly extending arms 12—12. The frame 10 is constructed of stock which is round in cross section and which is sufficiently pliable to facilitate the bending of the bight portion 11 to various curvatures to fit the contour of the upper lip of the user of the nasal filter device. Each arm 12 supports a wing member 13 in the form of a metal plate, the inner end of the said plate being formed into a vertical sleeve 14 which fits about the reduced portion 15 provided on the arm 12. By this construction, each wing member 13 is swingably connected on a substantially vertical axis upon an arm 12. Formed integral with the wing plate 13 and overlying the same is a front spring clip 16, the free end of which faces downwardly. Also formed integrally with each wing plate 13, and overlying the rear side of the wing plate is a rear spring clip 17, the free end of which extends below the plate and terminates in a forwardly extending lip 18, which lip coacts with a forwardly extending portion 19 depending from the bottom edge of the wing plate. Formed integral with the outer end of each wing plate 13 and overlying the said plate is a hook 20 for the purpose to be presently explained.

The frame 10 just described is of a shape and size to snugly fit the face of a user in the area of the nose, and when in use, the bight portion 11 fits against the upper lip beneath the nose while the wing members 13 are disposed against the face adjacent opposite sides of the nose, as best illustrated in Figures 1, 2, and 3.

Associated with the frame 10 is a gauze filter cloth 21 which is illustrated in plan in Figure 7 of the drawing. While the filter cloth is described as being of gauze material, the same may be made of any other suitable material having the same filtering characteristics and may be a single thickness, or of more than single thickness. Whereas the top edge of the cloth 21 is of irregular shape to more or less fit the contour of the nose of a wearer, the said edge may be straight or parallel with the bottom edge. In attaching the filter cloth 21 to the supporting frame 10, the bottom edge of the cloth of Figure 7 is inserted between lips 18 and parts 19 and is pulled upward in position between the rear clips 17 and the wing plates 13 so that the cloth is in back of the frame 10. The loose portion of the cloth, which is that part of it above the dotted line 22 of Figure 7, is now to be folded forwardly around the bight portion 11 of the frame 10 and is to be extended upward and inserted between the front clips 16. Thus one fold of the cloth is in back of the arms 12—12 and is held by the rear spring clips 17, and the front fold of the cloth is in front of the arms 12—12 and is held by the front spring clips 16. Sufficient slack is provided in the cloth between the arms 12—12 to form a pocket which is to fit over the nose. By shifting the cloth through the rear clips 17 and likewise through the front clips 16 the filter cloth can be adjusted to provide a snug fit about the nose as shown in Figures 1 to 3 inclusive, and to fit beneath the nose to overlie the entrance to the nostrils.

For securing the frame 10 and the filter cloth carried thereby in position over the nose of a wearer, I provide an elastic head band 21', the ends of which are provided with eyes 22 which engage the respective hooks 20 on the wing members 13. The elastic band 21' places sufficient tension upon the frame to hold the same in a comfortable set position upon the face of the wearer. The hook and eye connection between the ends of the head band and the frame facilitates the easy separation of these parts for removal of the device without necessitating the disarrangement of the hair of the wearer by swinging the head band upwardly over the top of the head.

When the nasal filter device is in position for use, the filter cloth acts to prevent irritating airborne particles from entering the nostrils of the user, and by reason of the folded arrangement of the filter cloth, a double filtering action is obtained. By applying to the filter cloth any suitable substance that will collect and hold these airborne particles, the efficiency and effectiveness of the filtering action is thereby increased. Likewise, when it is desired for purposes of medication, any suitable medicament may be applied to the filter cloth.

In Figure 1 of the drawing, I have illustrated in dotted lines one of the folds of the filter cloth dropped down over the mouth of the wearer, for in some uses of the device, it may be desired to prevent inhalation of particles through the mouth. This depending portion shown in dotted lines is held in proper position by a neck band 23 which has clasps 24 which grip opposite sides of the filter cloth and holds the same in taut position.

While I have shown and described what I consider to be the most practical embodiment of my invention, I wish it to be understood that such changes and alterations as come within the scope of the appended claims may be resorted to if desired.

Having thus described the invention, what I claim as new and desire to secure by Letters Patent of the United States, is:

1. A nasal filter device comprising a rigid preformed U-shaped frame adapted to fit beneath the nose and adjacent region of the face of a user, clamps carried by the arms of said U-shaped frame, a filter cloth bridging said frame and secured thereto by said clamps, and a head encircling band connected to said frame for securing the device in position upon a wearer with a portion of said filter cloth overlying the entrance to the nostrils of the wearer's nose.

2. A nasal filter device comprising a rigid U-shaped frame having a pre-formed forwardly bowed bight portion and upstanding arms, clips carried by said arms, a filter cloth folded around the bight portion of said frame with the double folds thereof extending upwardly and bridging the space between the arms of said frame and held in such position by said clips, and a head encircling band having its ends secured to said arms substantially as and for the purpose specified.

3. A nasal filter device comprising a rigid U-shaped frame having a pre-formed forwardly bowed bight portion and upstanding arms, a filter cloth folded about said bight portion with the two folds thereof extending upwardly along opposite sides of said arms, clips carried by opposite sides of said arms for clamping the folds of said filter cloth, and a head encircling band having its ends secured to said arms.

4. A nasal filter device comprising a U-shaped frame having a forwardly bowed bight portion and upstanding arms, a filter cloth folded about the bight portion with the two folds thereof extending upwardly along opposite sides of said arms, a pair of wing members connected to said arms and extending outwardly therefrom, each wing member having clips on opposite sides thereof, the free ends of said clips facing downwardly with the two folds of said cloth held thereby, and a head band having its ends connected to the respective wing members.

5. A nasal filter device comprising a U-shaped frame having a forwardly bowed bight portion and upstanding arms, a filter cloth folded about the bight portion with the two folds thereof extending upwardly along opposite sides of said arms, a pair of wing members connected to said arms and extending outwardly therefrom, each wing member having clips on opposite sides thereof, the free ends of said clips facing downwardly with the two folds of said cloth held thereby, inwardly extending hooks provided on said wing members, and a head band having eyes at opposite ends thereof in hooking engagement with said hooks.

6. A nasal filter device comprising a rigid U-shaped frame adapted to fit against the human face in the region of the lower end of the nose, a filter cloth folded about the bight portion of said frame so as to be disposed on opposite sides thereof, means on opposite sides of said frame to clamp the folded portions of said filter cloth to said frame, and a head band connected to said frame for securing the device in use over the lower end of the nose of a wearer.

7. A device for supporting a nose filter element over the nose of a wearer comprising a U-shaped frame having a forwardly bowed bight portion and upstanding arms, a pair of wing members resectively connected to said arms and extending outwardly therefrom, clips carried by one side of said wing members for supporting a filter element therefrom, and a head band having its ends connected to the respective wing members.

8. A device for supporting a nose filter element over the nose of a wearer comprising a rigid U-shaped frame, a pair of wing members respectively connected to the upstanding arms of said frame and extending outwardly therefrom, filter cloth supporting clips carried by said wing members, and a head band having its ends respectively connected to said wing members.

ELMER W. ANDERSON.